United States Patent [19]

Ishikawa

[11] Patent Number: 5,216,522
[45] Date of Patent: Jun. 1, 1993

[54] IMAGE DATA PROCESSING APPARATUS WITH INDEPENDENT ENCODING AND DECODING UNITS

[75] Inventor: Yuji Ishikawa, Yokohama, Japan
[73] Assignee: Canon Kabushiki Kaisha, Tokyo, Japan
[21] Appl. No.: 748,861
[22] Filed: Aug. 23, 1991
[30] Foreign Application Priority Data
Aug. 27, 1990 [JP] Japan .................................. 2-226029
[51] Int. Cl.[5] ............................................. H04N 1/21
[52] U.S. Cl. .................................................. 358/448
[58] Field of Search ........ 358/448, 404, 409, 455–456, 358/460, 468, 426–427, 261.1–261.4

[56] References Cited

U.S. PATENT DOCUMENTS

| | | | |
|---|---|---|---|
| 4,739,397 | 4/1988 | Hayashi | 358/448 |
| 4,760,462 | 7/1988 | Ogawa | 358/448 |
| 4,776,025 | 10/1988 | Hosoda | 358/448 |
| 4,949,188 | 8/1990 | Sato | 358/448 |

Primary Examiner—Stephen Brinich
Attorney, Agent, or Firm—Fitzpatrick, Cella, Harper & Scinto

[57] ABSTRACT

An image data encoding/decoding device has a memory for parallel data input/output, a data input unit, a data output unit, an encoding unit, a decoding unit, and a memory control unit. Separate encoding and decoding units are employed to ensure efficient encoding/decoding operations. The image data are handled in serial form in the input, output, encoding and decoding units and in parallel form only at the input to or output from the memory, so that these units can effect simultaneous parallel functions in mutually independent manner. Also, efficient access to the memory is ensured by the memory control unit, which handles simultaneous requests for access from various units according to a predetermined order of priority.

20 Claims, 8 Drawing Sheets

IMAGE DATA PROCESSING APPARATUS WITH INDEPENDENT ENCODING AND DECODING UNITS

BACKGROUND OF THE INVENTION

1. Field of the Invention

The present invention relates to an encoding/ decoding device for image data, adapted for use in a facsimile apparatus, an electronic file or the like.

2. Related Background Art

Compression encoding of image data is already employed in the facsimile apparatus, electronic files and the like, for improving the efficiency of transmission or storage.

Figure 10:
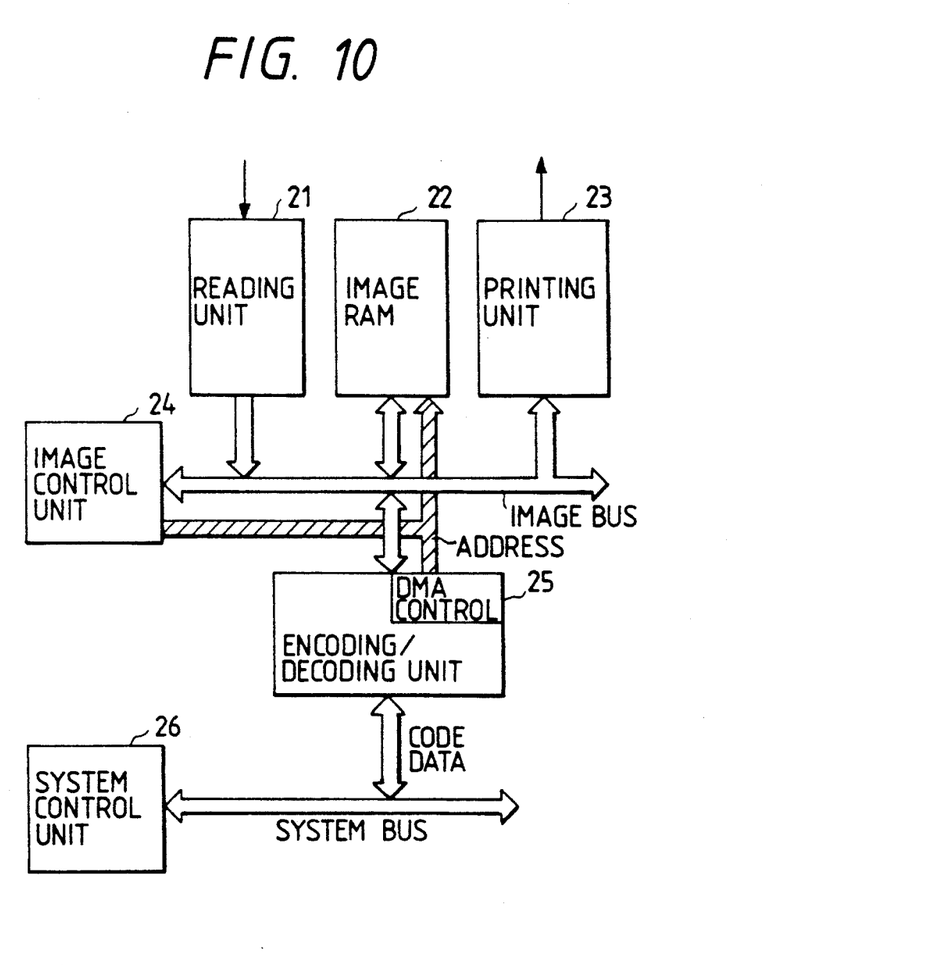
FIGS. 10 and 11 are block diagrams showing conventional examples of an encoding/decoding device.
Figure 11:
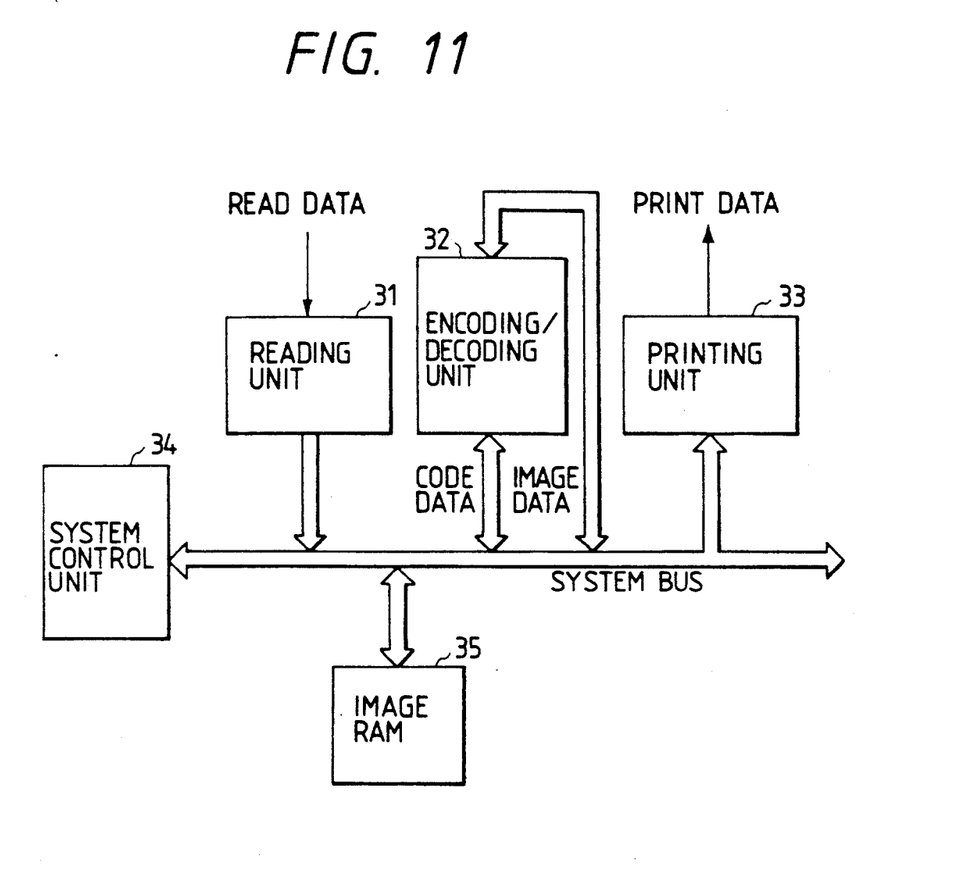

FIGS. 10 and 11 illustrate examples of an encoding/decoding device.

Referring to FIG. 10, image data from an image reading unit 21 are stored in an image RAM 22 through an image bus, under the control of an image control unit 24. Subsequently, the image data from the image RAM 22 are supplied, through the image bus under DMA control, to an encoding/decoding unit 25 and all encoded therein. The code data obtained by the encoding are supplied through a system bus, under the control of a system control unit 26, to a transmission unit or a memory unit.

On the other hand, code data from a reception unit or the memory unit are supplied through the system bus to the encoding/decoding unit 25 and are decoded therein, and the decoded image data are stored in the image RAM 22, through the image bus and under the DMA control. Subsequently the image data in said image RAM 22 are supplied through the image bus to a printer unit 23 and are reproduced on a recording material such as paper.

In the structure shown in FIG. 11, image data from a reading unit 31 are stored in an image RAM 35 through a system bus, under the control of an image control unit 34. Subsequently, the image data from the image RAM 35 are supplied through a system bus to an encoding/decoding unit 32 and are encoded therein. The code data obtained by said encoding are supplied to a transmission unit or a memory unit through a system bus, under the control of a system control unit 34.

On the other hand, code data from a reception unit or the memory unit are supplied through the system bus to the encoding/decoding unit 32 and are decoded therein, and the decoded image data are stored in the image RAM 35 through the system bus. Subsequently the image data in said image RAM 35 are supplied through the system bus to a printer unit 33 and are reproduced on a recording material such as paper.

However, the structure shown in FIG. 10 is associated with the drawback of repairing large-sized circuitry, since it requires two data buses, namely the system bus and the image bus, and also a control unit 26 for the system bus and a control unit 24 for the image bus.

Also, the encoding/decoding unit 26 cannot execute the encoding and the decoding at the same time. Consequently, in a facsimile apparatus designed to transmit encoded data stored in advance in a large-capacity memory attached to the system bus, there is required a long processing time for obtaining data for transmission, since the code data in said memory are decoded to reproduce the original image in the memory of the image bus and are again subjected to an encoding process suitable for transmission.

Also there is required a long access time, since the image RAM 22 for exchanging the image data with the encoding/decoding unit 25 is composed of an external memory.

On the other hand, the structure shown in FIG. 11 does not require separate system and image buses.

However, the processing ability of the system control unit 34 is significantly deteriorated, because the input and output of the image data and the code data to and from the encoding/decoding unit 32, the transmission of data from the reading unit 31 to the image RAM 35, and that from the image RAM 35 to the printer unit 33 are all conducted through the system bus.

SUMMARY OF THE INVENTION

In consideration of the foregoing, an object of the present invention is to provide an image data processing device with simple circuit structure and improved efficiency of image data processing.

Another object of the present invention is to provide an image data processing device in which the encoding unit and the decoding unit are composed of entirely independent circuits whereby the encoding and decoding can be executed simultaneously.

Still another object of the present invention is to handle the image data in serial form inside an encoding unit, a decoding unit, an image reading unit and a printer unit and to handle said image data in parallel form only upon input to or output from a memory unit, thereby preventing deterioration in the processing ability even during simultaneous function of various units.

Still another object of the present invention is to enable efficient access to a single memory unit by the image reading unit, printer unit, encoding unit and decoding unit.

The foregoing and still other objects of the present invention, and the advantages thereof, will become fully apparent from the following description, which is to be taken in conjunction with the attached drawings.

DESCRIPTION OF THE PREFERRED EMBODIMENTS

Figure 1:
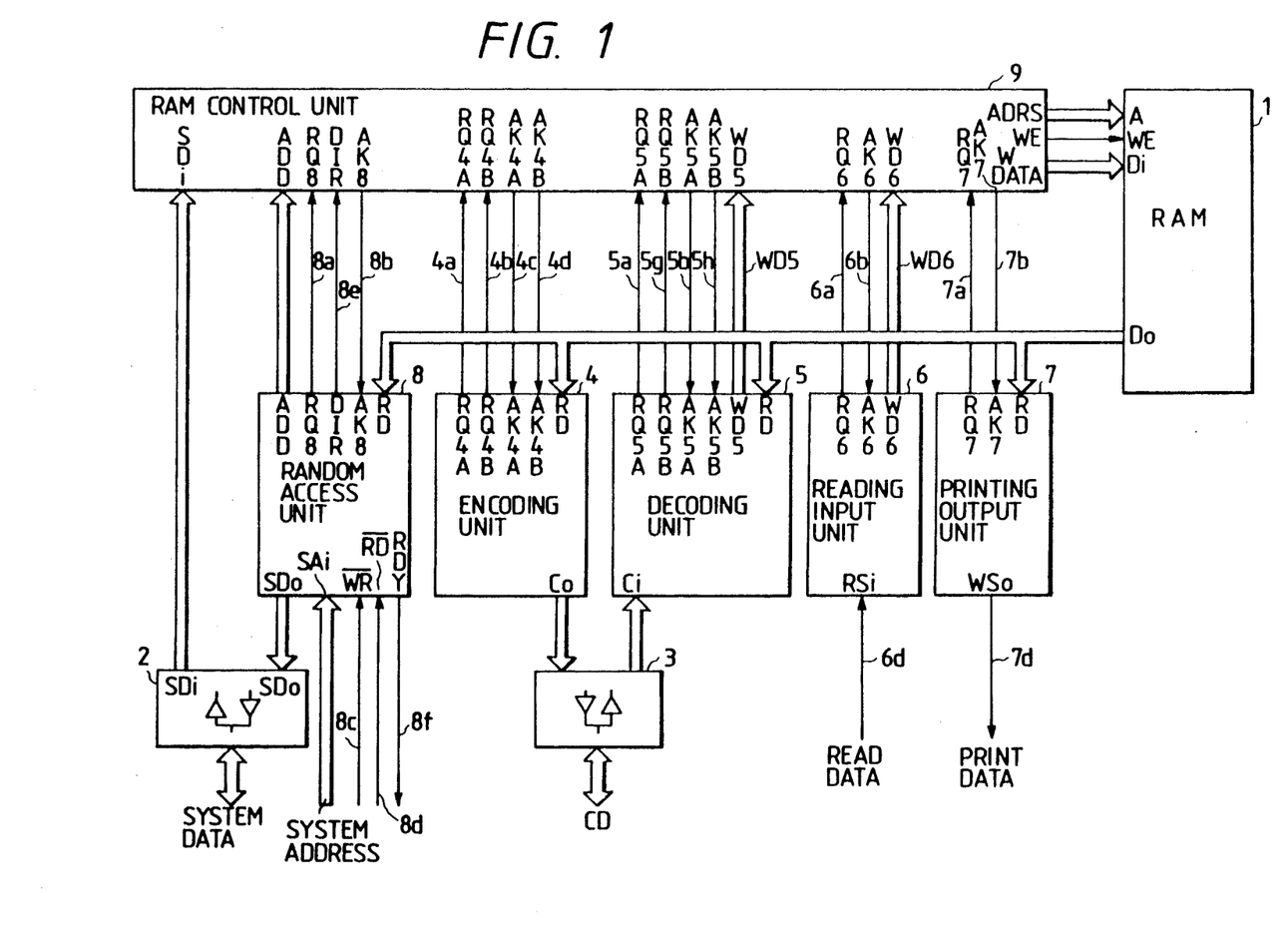
FIG. 1 is a block diagram of an integrated encoding/decoding device embodying the present invention.

FIG. 1 is a block diagram of an integrated circuit constituting an embodiment of the present invention, wherein are provided a RAM 1 of a capacity capable of storing image data of plural lines; an input/output buffer 2 constituting an interface with a system data bus; an input/output buffer 3 for a code data bus for input and output of code data CD; an encoding unit 4 for receiving image data of an encoding line and a reference line from the RAM 1, effecting already known two-dimensional MR encoding and releasing the obtained codes from an output port Co; a decoding unit 5 for decoding input MR codes Ci by receiving image data of a reference line from the RAM 1 and releasing decoded image data WD5; a read data input unit 6 for converting input serial image data, received from the outside (for example from an image reader), into parallel form and releasing thus obtained parallel data WD6; a print data output unit 7 for converting image data, received from the RAM 1, into serial form and sending thus obtained serial data WSO to the outside (for example to a printer); and a random access unit 8 for receiving an arbitrary address SAi and signals WR, RD indicating the kind of access to the RAM 1 from the system bus, sending the entered address ADD and a signal DiR indicating the kind of access (read or write) to a RAM control unit 9, and, in case of reading, receiving data $D_o$ from the RAM 1 through an input port RD and releasing said data as data SDo to the input/output buffer 2.

The RAM control unit 9 controls the requests for access to the RAM 1 from the encoding unit 4, decoding unit 5, input unit 6, output unit 7 and random access unit 8, sends the RAM 1 an address ADR predetermined for each source of request upon permitting an access, and, in case of data writing into the RAM 1, selects the writing data DATA for supply to the RAM 1.

Figure 2:
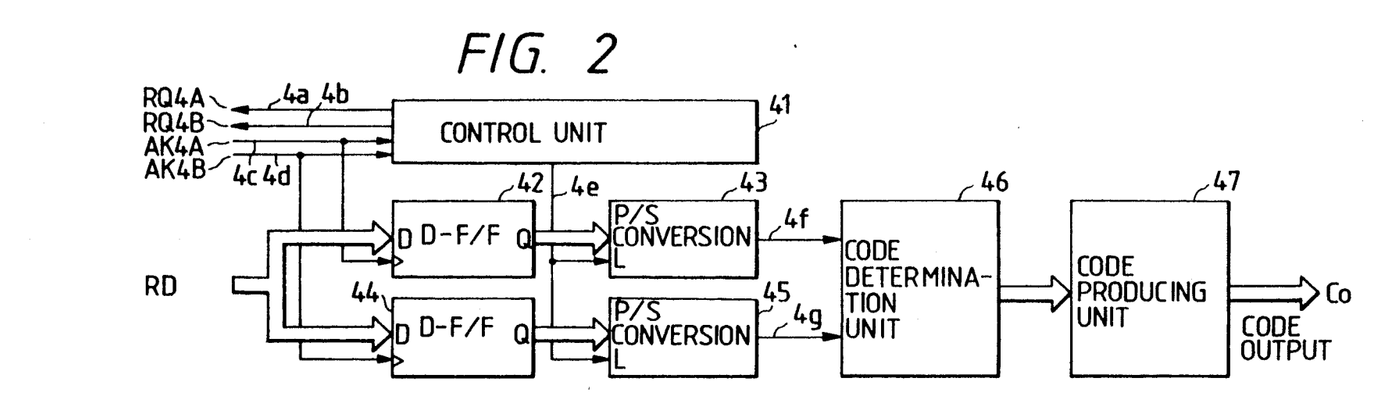
FIG. 2 is a block diagram showing an example of the structure of an encoding unit.

FIG. 2 shows an example of the structure of the encoding unit 4 shown in FIG. 1, wherein are provided a control unit 41 for controlling input request for reference data and encoded data in cooperation with the RAM control unit 9; an input buffer 42 for temporarily storing encoded data entered from the RAM 1; a parallel-to-serial conversion unit 43 for receiving data from the input buffer 42 and releasing serial data $4f$; an input buffer 44 for temporarily storing reference data entered from the RAM 1; a parallel-to-serial conversion unit 45 for receiving data from said input buffer 44 and releasing serial data $4g$; a code determination unit 46 for determining the encoding mode from the encoding data $4f$ and reference data $4g$; and a code producing unit 47 for generating a code Co corresponding to the encoding mode determined in said code determination unit 46.

Also there are shown a signal $4a$ (RQ4A) for requesting, to the RAM control unit 9, the input of encoding data; a signal $4b$ (RW4B) for requesting, to the RAM control unit 9, the input of reference data; a response signal $4c$ (AK4A) from the RAM control unit 9 in response to said request signal $4a$; a response signal $4d$ (AK4B) from the RAM control unit 9 in response to said request signal $4b$; and a signal $4e$ for instructing the input of data from the input buffers 42, 44 to the parallel-to-serial conversion units 43, 45.

Figure 3:
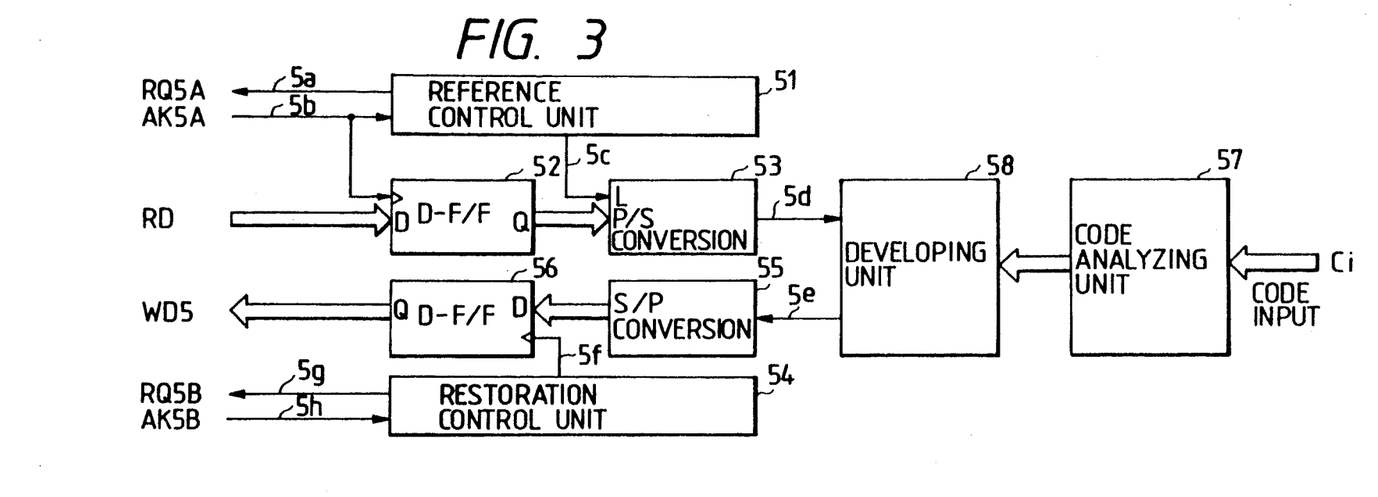
FIG. 3 is a block diagram showing an example of the structure of a decoding unit.

FIG. 3 is a block diagram showing an example of the structure of the decoding unit 5 shown in FIG. 1, wherein are provided a reference control unit 51 for controlling the input of image data of reference line in cooperation with the RAM control unit 9; an input buffer 52 for the reference data read from the RAM 1; a parallel-to-serial conversion unit 53 for converting data from said input buffer 52 into a serial signal $5a$; a restoration control unit 54 for controlling the output of image data of a restoration line; a serial-to-parallel conversion unit 55 for converting serial restored data $5e$ into a parallel signal; an output buffer 56 for sending the output data of said serial-to-parallel conversion unit 55 to the RAM control unit 9; a code analyzing unit 57 for analyzing the code of code data Ci received from the outside (for example from a reception circuit); and a developing unit 58 for restoring original image data according to the result of analysis by said analyzing unit 57 and the reference data $5d$.

There are also shown a signal $5a$ (RQ5A) for requesting, to the RAM control unit 9, the input of reference data; a response signal $5b$ (AK5A) from the RAM control unit 9 in response to said request signal RQ5A; a signal $5c$ for loading the data of the input buffer 52 into the parallel-to-serial conversion unit 53; a signal $5g$ (RQ5B) for requesting, to the RAM control unit 9, the output of restored data; and a response signal $5h$ (AK5B) from the RAM control unit 9 in response to said request signal RQ5B.

Figure 4:
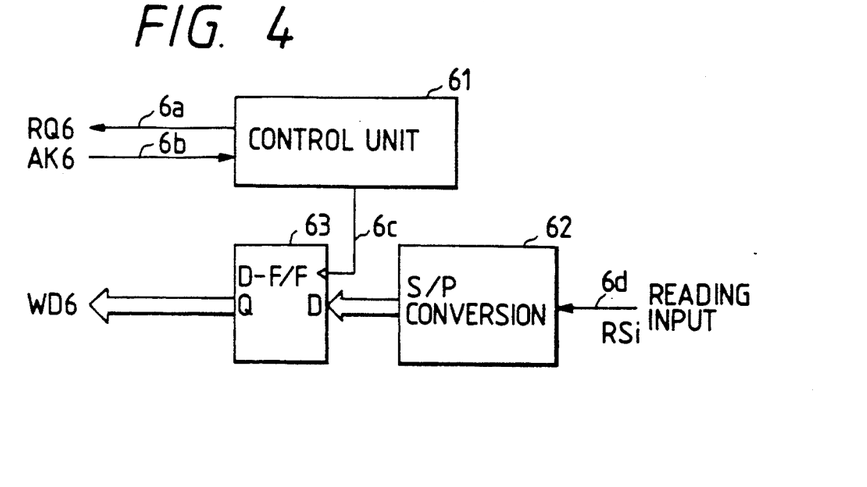
FIG. 4 is a block diagram showing an example of the structure of a data input unit.

FIG. 4 is a block diagram showing an example of the structure of the input unit 6 shown in FIG. 1, wherein are provided an output control unit 61 for controlling the output of read data RSl to the RAM 1; a serial-to-parallel conversion unit 62 for converting serial read data RSi into a parallel signal; and an output buffer 63 for the parallel read data.

Also there are shown a signal $6a$ (RQ6) for requesting, to the RAM control unit 9, the output of data of the output buffer 63; a response signal $6b$ (AK6) from the RAM control unit 9 in response to said output request signal RQ6; and a signal $6c$ for loading the parallel data into the output buffer 63.

Figure 5:
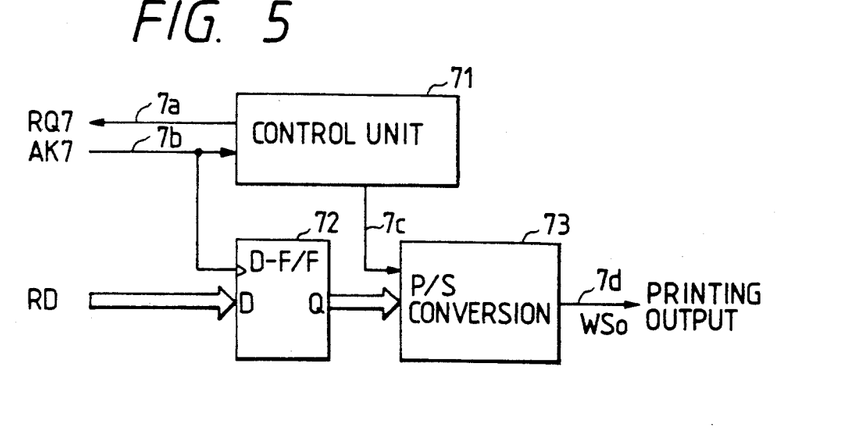
FIG. 5 is a block diagram showing an example of the structure of a data output unit.

FIG. 5 is a block diagram showing an example of the structure of the output unit 7 shown in FIG. 1, wherein are provided a control unit 71 for controlling the input of print data from the RAM 1; an input buffer 72 for the input data from the RAM 1; and a parallel-to-serial conversion unit 73 for converting the data of said input buffer 72 into a serial signal $7d$.

There are also shown a signal $7a$ (RQ7) requesting, of the RAM control unit 9, the input of print data; a response signal $7b$ (AK7) from the RAM control unit 9, in response to said request signal RQ7; and a signal $7c$ for loading the data of the input buffer 72 into the parallel-to-serial conversion unit 73.

Figure 6:
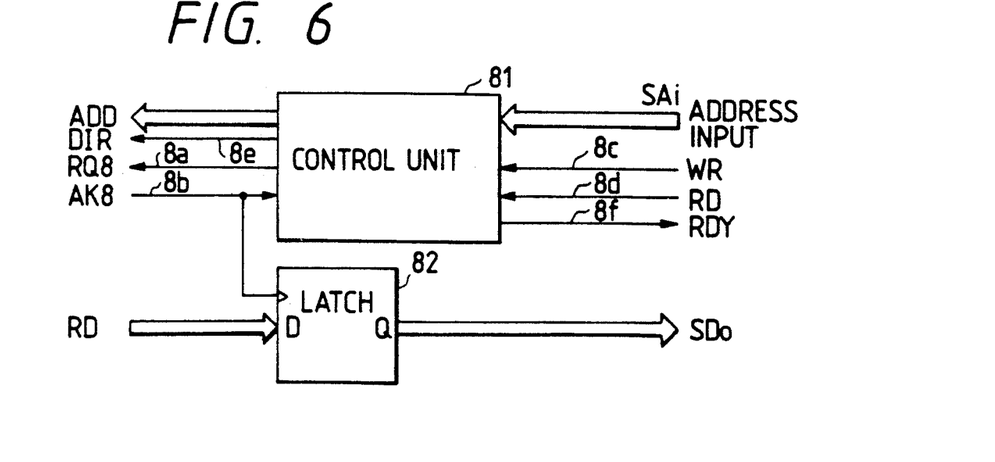
FIG. 6 is a block diagram showing an example of the structure of a random access unit.

FIG. 6 is a block diagram showing an example of the structure of the random access unit 8 shown in FIG. 1, wherein provided a control unit 81 for controlling the request for access to the RAM 1 in response to the input of address SAi from the external system control unit; and a latch 82 for holding the data read from the RAM 1.

There are also shown a signal $8a$ (RQ8) for requesting, to the RAM control unit 9, the access to the RAM 1; a response signal $8b$ (AK8) from the RAM control unit 9, in response to said access requesting signal RQ8; an input signal $8c$ indicating a writing access to the RAM 1; a signal $8d$ indicating a reading access to the RAM 1; an output signal $8e$ sent together with said access requesting signal $8b$ to the RAM control unit 9 for indicating whether said access is for reading or writing; and a signal $8f$ released in response to the access request from the external system control unit, for temporarily suspending the function of said external system control unit until the response signal AK8 from the RAM control unit 9 is returned.

Figure 7:
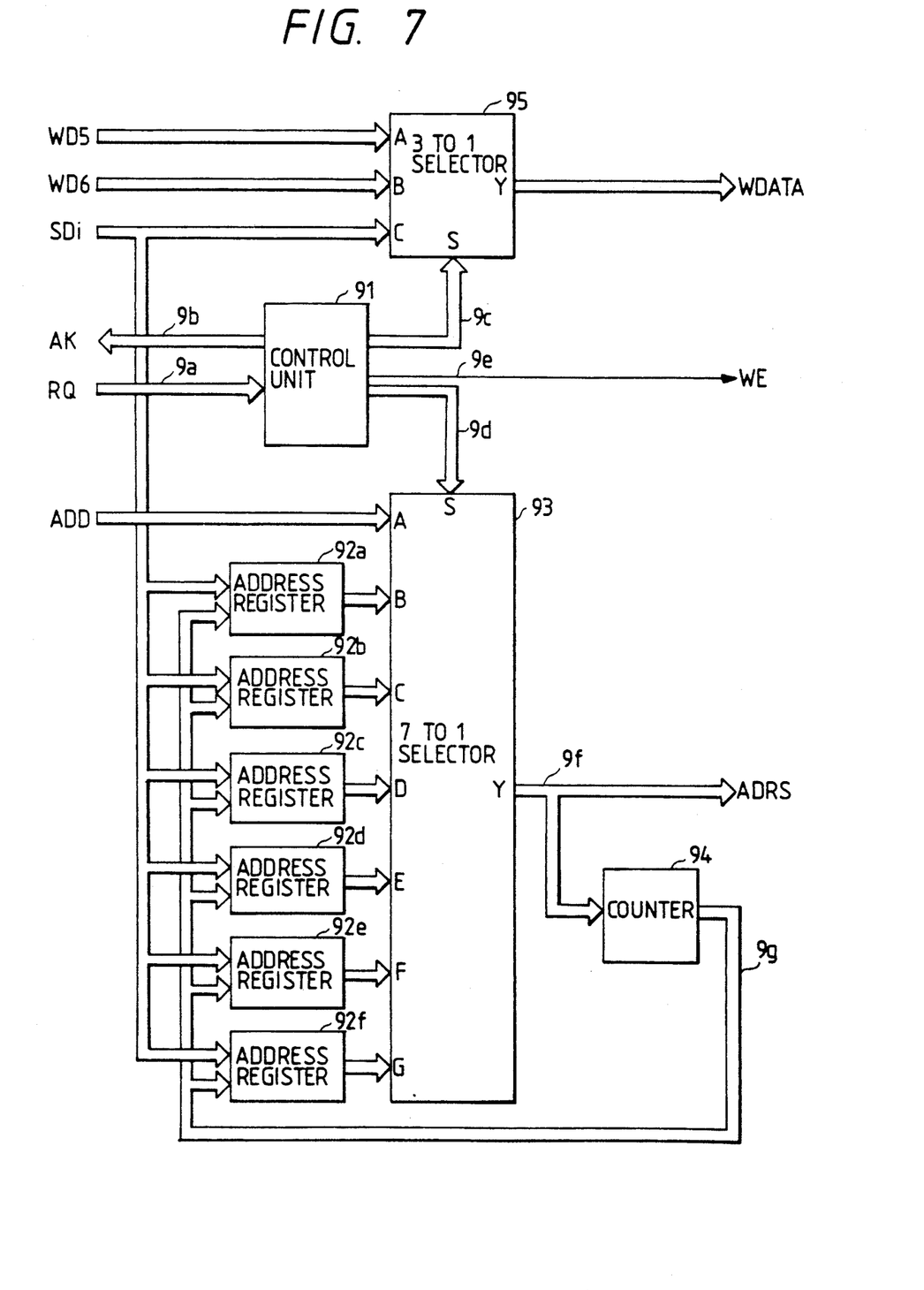
FIG. 7 is a block diagram showing an example of the structure of a RAM control unit.

FIG. 7 is a block diagram showing an example of the structure of the RAM control unit 9 shown in FIG. 1, wherein are provided a control unit 91 for determining the right of access in response to the requests for access to the RAM from the above-mentioned units, and generating predetermined address output and response signal; address registers 92a-92f for storing RAM addresses predetermined arbitrarily for the access requesting units other than the random access unit 8; a selector 93 for selectively releasing an address corresponding to the unit which has acquired the right of access, among the addresses in said address registers 92a-92f and from the random access unit 8, in response to an instruction from the control unit 91; a counter 94 for receiving the output of said address selector 93 and adding "1" thereto; and a data selector 95 for selectively releasing writing data at the data writing into the RAM 1.

Also there are shown a signal 9a collectively representing the access request signals RQ4A, RQ4B, RQ5A, RQ5B, RQ6, RQ7 and RQ8 from various units; a signal 9b collectively representing the response signals AK4A, AK4B, AK5A, AK5B, AK6, AK7 and AK8; a selection signal 9c for the writing data when the right of access is given to the access request signals RQ5A, RQ6 or RQ8; a selection signal 9d for selecting either one of the address registers 92a-92f or address signal ADD in one-to-one correspondence with the requesting unit to which the right of access has been given by the control unit 91; a write signal 9e to the RAM 1; and an output signal 9g from the counter 94.

In the following there will be first explained the function of the RAM control unit 9 shown in FIG. 7.

At first, in the address registers 92a-92f, there are set initial values, indicating access-starting addresses in the RAM 1, through the system bus and the input/output buffer 2.

Then the access request signals RQ4A, RQ4B from the encoding unit 4, those RQ5A, RQ5B from the decoding unit 5, that RQ6 from the input unit 6, that RQ7 from the output unit 7 and that RQ8 from the random access unit 8 are entered into the control unit 91, which gives the right of access to the RAM 1, to a request of highest priority according to a predetermined order of priority.

Figure 8:
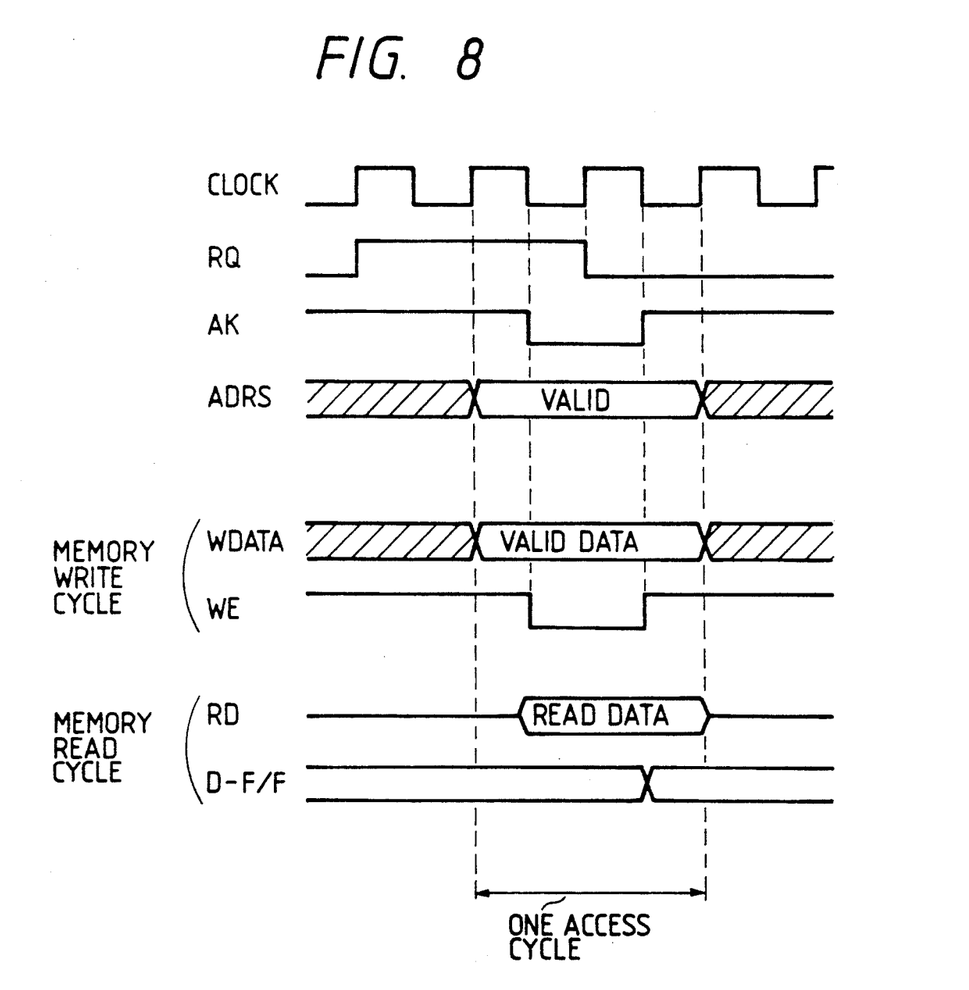
FIG. 8 is a timing chart of RAM access.

FIG. 8 is a timing chart of the function of said control unit 91, wherein the clock pulses are the driving clock pulses of the present integrated circuit. The request signals RQ are sampled at the upshift end of the clock pulse.

Then the selector 93 selects an address register 92 corresponding to the requesting unit to which the right of access has been given, and releases the content of said register as the address ADRS to the RAM 1. Also as the response signal AK to the requesting unit, the corresponding signal AK is shifted to the low level state for a cycle from the next downshift end of the clock pulse. In response to said response signal AK, the requesting unit terminates the request signal RQ.

In case the current access is for data writing to the RAM 1, simultaneously with the address output to the RAM 1, the selector 95 selects the corresponding writing data and sends said data WDATA to the RAM 1, and a writing pulse WE is released.

On the other hand, in case of data reading, the read data RD are fetched in the input buffer of the requesting unit at the upshift edge of the above-mentioned response signal AK.

Parallel to the above-explained access operations, the address supplied to the RAM 1 is loaded in the counter 94, then is added by "1" and is returned to the address counter which has been selected. Consequently the next access will be made to a one-step advanced address.

For the access request from the random access unit 8, there is not employed an address register as in the requests from other units, and a system address is directly entered into the selector 93.

Now there will be explained the function of the encoding unit 4 shown in FIG. 2. Since the input buffers 42, 44 do not contain effective data in the beginning, request signals RQ4A, RQ4B for requesting data inputs from the RAM1 are sent to the RAM control unit 9. In response, effective data are entered into the input buffers 42, 44 by the response signals AK4A, AK4B from the RAM control unit 9. Then, by the signal 4e, the effective data in said input buffers are loaded in the parallel-to-serial conversion units 43, 45 and are supplied in the serial form to the code determination unit 46.

As the data in the input buffers 42, 44 have been transferred to the next parallel-to-serial conversion units 43, 45, the data input request signals RQ4A, RQ4B are released again to hold the effective data in the input buffers 42, 44 again.

In the above-explained operations, in the normal state, the generation of the data input request signals RQ4A, RQ4B requires at least a time for the parallel-to-serial conversion units 43, 45 to effect the data shift of the number of bits of the data of the input buffers 42, 44.

Now there will be explained the function of the decoding unit shown in FIG. 3.

Code data Ci entered from the outside through the input/output buffer 3 are at first analyzed in the code analyzing unit 57, and are transferred to the developing unit 58.

In the developing process in said developing unit 58, for decoding of a two-dimensionally encoded line requiring data of a reference line, the reference control unit 51 sends, to the RAM control unit 9, the signal RQ5A for requesting the input of image data of the reference line. In response the RAM control unit 9 executes predetermined operations and releases the response signal AK5A, whereby the data of the reference line are entered into the input buffer 52. Because of presence of an effective signal in said input buffer 52, the signal 5c is released whereby the data are loaded into the parallel-to-serial conversion unit 53 and are entered, in the form of serial data 5d, into the developing unit 58.

On the other hand, the data request signal RQ5A is again released whereby next effective data are supplied to the input buffer 52.

Serial restored data 5e, obtained by the above-explained developing process, are supplied to the serial-to-parallel conversion unit 55, and are transferred to the output buffer 56 by the unit of a predetermined number of bits.

At each entry of effective data into the output buffer 56, the restoration control unit 54 sends; to the RAM control unit 9, the signal RQ5B requesting the data writing into the RAM 1, and, in response, the RAM control unit 9 executes predetermined operations to store said data in a predetermined address of the RAM 1.

As explained above, the interval of the access request signals RQ5A, RQ5B of the decoding unit 5 is, as in the encoding unit 4, at least equal to the number of bits of the input buffer 52 and the output buffer 56.

The function of the input unit 6 shown in FIG. 4 is similar to that of the serial-to-parallel conversion unit 55 and the output buffer 56 of said decoding unit 5, and the function of the output unit 7 shown in FIG. 5 is similar to that of the input buffer 52 and the parallel-to-serial conversion unit in said decoding unit 5.

Now there will be explained the function of the random access unit 8 shown in FIG. 6.

When the control unit 81 receives, from the outside, an arbitrary RAM address SAi and signals $\overline{WR}$, $\overline{RD}$ indicating a writing access or a reading access to the RAM 1, it sends, to the RAM control unit 9, the address signal ADD, the signal DiR indicating the direction of access and the access request signal RQ8.

In case of a reading access, in response to the response signal AK8 from the RAM control unit 9, the data of the RAM 1 at said address are fetched in the latch 82 and released to the output port SDO.

In case of a writing access, the writing data are selected by the data selector 95 in the RAM control unit 9, directly from the externally entered data and are released for writing into the RAM 1. In this operation, the read data are fetched in the latch 82 but are not released to the external bus.

Figure 9:
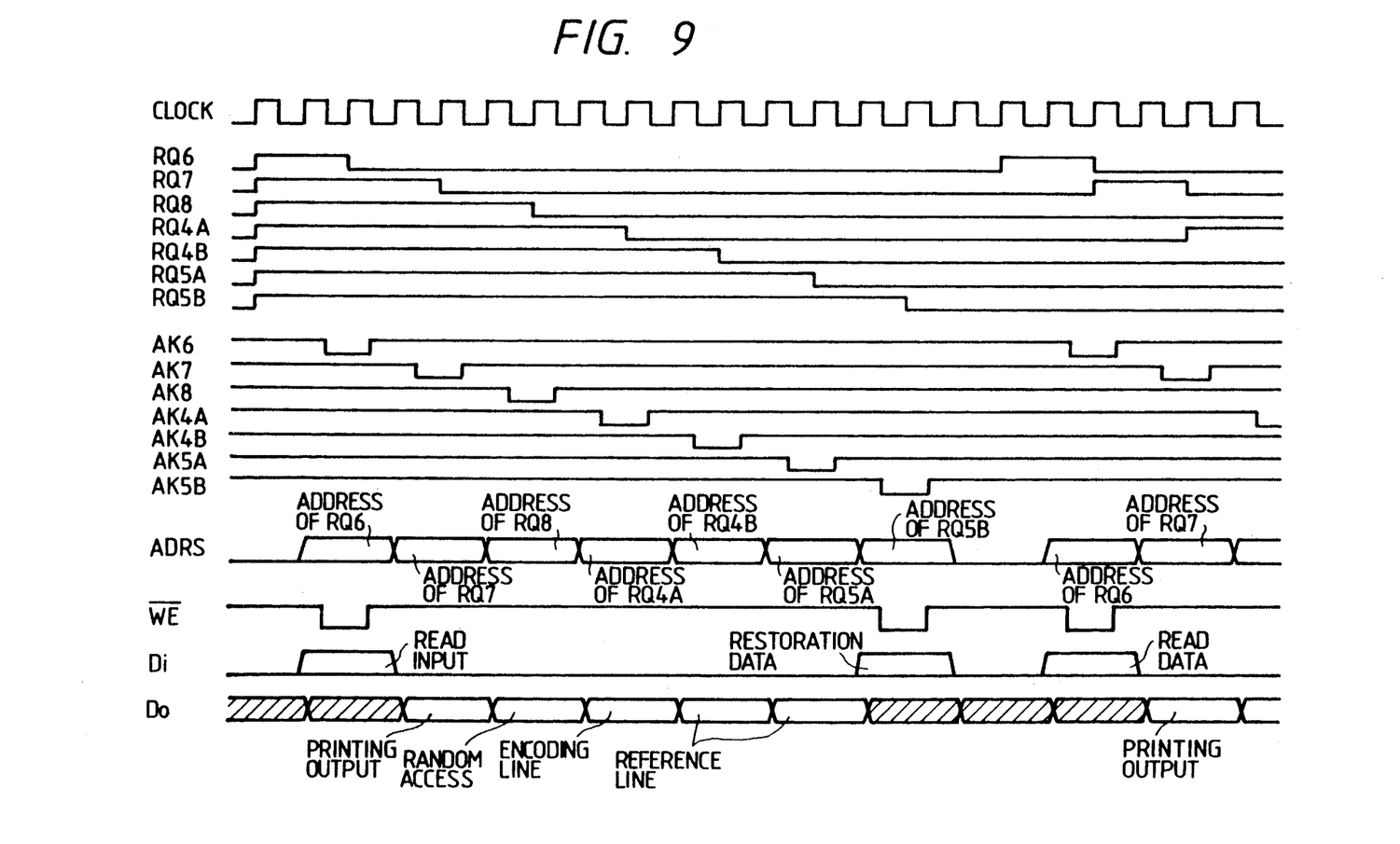
FIG. 9 is a timing chart of the function of the RAM control unit.

FIG. 9 shows the operation when all the access request signals explained above are simultaneously generated in the embodiment shown in FIG. 1.

In this timing chart there are assumed following conditions:

1) Order of priority of access: RQ6 > RQ7 > RQ8 > RQ4A > RQ4B > RQ5A > RQ5B;

2) A cycle of RAM access consists of two driving clock pulses; and

3) Data width of the RAM 1 is 16 bits.

Under these conditions, the right of access to the RAM 1 is given according to the above-mentioned order of priority. Thus, there is generated a long waiting time, at the first access request, until the response to the request signal RQ5B of the lowest priority, but the waiting time scarcely occurs thereafter even if the aforementioned shift process is conducted at a clock rate of the aforementioned driving clock pulses, since the access requests from various units, other than the random access unit 8, are made at an interval of the shift of 16 bits.

Also the access requests from the random access unit 8 do not have a significant influence, since such requests are not too frequent, if they are made for example from an external microcomputer.

Other Embodiments

Simultaneous parallel functions of all the units can be achieved without sacrificing the processing ability, by selecting the bit width of the RAM 1 and the number of access requesting units so as to satisfy the relation:

$$W \times T_{SF} \geq N \times T_{AC}$$

wherein W is the bit width of input/output data of the RAM 1; $T_{AC}$ is the number of basic clock pulses required for an access to the RAM; N is the number of the access requesting units which handle the input/output data of the RAM internally in the form of serial data; and $T_{SF}$ is the number of basic clock pulses required for a bit of serial signal of the fastest data rate, constituting the input/output data for the RAM 1.

Also, in the foregoing example of the encoding unit 4, the encoding line data 4f and the reference line data 4g in the serial form may be supplied to the code determining unit 46, with deletion at every predetermined period. A main scanning reduction circuit for effecting such operation may be applied to a facsimile apparatus equipped with a memory, whereby, in case of reducing the already encoded image data in said memory according to the destination of transmission, it is rendered possible to store the restored data in the RAM 1 by the decoding unit and to simultaneously re-encode the restored line in the RAM 1 with reduction of main scanning in the encoding unit 4. Also, the order of priority, which is fixed in the above-explained embodiment, may be made flexible. For example the unit which has just been given the right of access may be given the lowest priority at the next access.

As explained in the foregoing, an integrated circuit incorporating not only the encoding and decoding units but also the memory, input and output units allows to simplify the external circuits. Also, the processing ability is improved since the system bus is not used for image data transfer.

Also, since the input, output, encoding and decoding units handle the image data in the form of serial data, the processing ability is not deteriorated by the simultaneous parallel functions of these units.

Also, the incorporation of the memory in the integrated circuit increases the access speed, in comparison with the access of access to an external RAM.

Furthermore, partial rewriting of image data can be easily attained by constituting the memory for storing line data, with a random access memory.

Though the present invention has been explained by reference to the preferred embodiments thereof, the present invention is not limited to such embodiments but is subject to various modifications within the scope and spirit of the appended claims.

What is claimed is:

1. An image data processing device, comprising:
   a memory unit having a capacity for storing image data of plural lines and allowing for input and output of parallel data;
   an input unit for receiving serial data and writing said data into said memory unit until serial-to-parallel conversion;
   an output unit for reading parallel data from said memory unit and releasing serial data by parallel-to-serial conversion of said parallel data;
   an encoding unit for reading image data of an encoding line from said memory unit, said effecting parallel-to-serial conversion and encoding processing, and outputting code data;
   a decoding unit for receiving and analyzing code data, developing said code data into serial image data, and storing said serial image data in said memory unit after serial-to-parallel conversion; and
   a memory control unit for controlling requests for access to said memory unit, generated by said input, output, encoding and decoding units.

2. An image data processing device according to claim 1, wherein said memory control unit, in case the requests for access to said memory unit are simultaneously generated by at least two of said input, output, encoding and decoding units, controls said requests for access according to a predetermined order of priority.

3. An image data processing device according to claim 1, wherein each of said input, output, encoding and decoding units generates said request for access at every writing or reading of parallel data of a predetermined number of bits.

4. An image data processing device according to claim 1, wherein said memory unit comprises a RAM.

5. An image data processing device according to claim 1, wherein said encoding unit conducts two-dimensional encoding.

6. An image data processing device according to claim 1, wherein said output unit outputs the serial data to a printer.

7. An image data processing device according to claim 1, further comprising reduction process means for effecting a reduction process for the serial image data developed by said decoding unit.

8. An image data processing device according to claim 9, wherein said encoding unit encodes the serial image data reproduction-processed by said reproduction means.

9. An image data processing device, comprising:
- a memory unit having a capacity for storing image data of plural lines and allowing for the input and output of parallel data;
- an input unit for receiving serial data and writing said data into said memory unit after serial-to-parallel conversion;
- an output unit for reading parallel data from said memory unit and releasing serial data by parallel-to-serial conversion of said parallel data;
- an encoding unit for reading image data of an encoding line from said memory unit, and effecting parallel-to-serial conversion and encoding processing, and outputting code data;
- a decoding unit for receiving and analyzing code data, developing said code data into serial image data, and storing said serial image data in said memory unit after serial-to-parallel conversion; and
- a memory conversion unit for controlling requests for access to said memory unit, generated by said input, output, encoding and decoding units,
- wherein said input, output, encoding and decoding units effect simultaneous parallel functions in a mutually independent manner.

10. An image data processing device according to claim 9, wherein said memory unit comprises a RAM.

11. An image data processing device according to claim 9, wherein said encoding unit conducts two-dimensional encoding.

12. An image data processing device according to claim 9, wherein said output unit outputs the serial data to a printer.

13. An image data processing device according to claim 9, further comprising reduction process means for effecting a reduction process for the serial image data developed by said decoding unit.

14. An image data processing device according to claim 13, wherein said encoding unit encodes the serial image data reproduction-processed by said reproduction means.

15. An image data processing device, comprising:
- a memory unit having a capacity for storing image data of plural lines and allowing for the input and output of parallel data;
- an input unit for receiving serial data and writing said data into said memory unit after serial-to-parallel conversion;
- an output unit for reading parallel data from said memory unit and releasing serial data by parallel-to-serial conversion of said parallel data;
- an encoding unit for reading image data of an encoding line from said memory unit, and effecting parallel-to-serial conversion and encoding processing, and outputting code data;
- a decoding unit for receiving and analyzing code data, developing said code data into serial image data, and storing said serial image data in said memory unit after serial-to-parallel conversion;
- a memory control unit for controlling requests for access to said memory unit, generated by said input, output, encoding and decoding units; and
- a random access unit for receiving an arbitrary address of said memory unit and a signal indicating whether the access to said memory unit is for data reading or data writing, and for making access to said address of said memory unit,
- wherein said memory control unit controls the request for access from said random access unit in addition to the request for access from said input, output, encoding and decoding units.

16. An image data processing device according to claim 15, wherein said memory unit comprises a RAM.

17. An image data processing device according to claim 15, wherein said encoding unit conducts two-dimensional encoding.

18. An image data processing device according to claim 15, wherein said output unit outputs the serial data to a printer.

19. An image data processing device according to claim 15, further comprising reduction process means for effecting a reduction process for the serial image data developed by said decoding unit.

20. An image data processing device according to claim 19, wherein said encoding unit encodes the serial image data reproduction-processed by said reproduction means.

* * * * *

UNITED STATES PATENT AND TRADEMARK OFFICE
CERTIFICATE OF CORRECTION

PATENT NO. : 5,216,522
DATED : June 1, 1993
INVENTOR(S) : YUJI ISHIKAWA

It is certified that error appears in the above-identified patent and that said Letters Patent is hereby corrected as shown below:

COLUMN 1

Line 13, "the" should be deleted.
    Line 24, "all" should read --are--.
    Line 56, "repairing" should read --requiring--.

COLUMN 3

Line 37, "are" should be deleted.
    Line 53, "(RW4B)" should read --(RQ4B)--.
    Line 68, "signal 5a;" should read --signal 5d;--.

COLUMN 6

Line 35, "at" should be deleted.

COLUMN 8

Line 45, "until" should read --after--.
    Line 51, "said" (second occurrence) should read --and--.

Signed and Sealed this

Eighth Day of March, 1994

BRUCE LEHMAN

Attest:

Attesting Officer

Commissioner of Patents and Trademarks